United States Patent
Falk

(10) Patent No.: US 10,949,574 B2
(45) Date of Patent: Mar. 16, 2021

(54) APPARATUS AND METHOD FOR DETECTING A PHYSICAL MANIPULATION ON AN ELECTRONIC SECURITY MODULE

(71) Applicant: Siemens Aktiengesellschaft, Munich (DE)

(72) Inventor: Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 343 days.

(21) Appl. No.: 15/943,794

(22) Filed: Apr. 3, 2018

(65) Prior Publication Data
US 2018/0330129 A1 Nov. 15, 2018

(30) Foreign Application Priority Data

May 11, 2017 (EP) .................................... 17170625

(51) Int. Cl.
*G06F 21/87* (2013.01)
*G06F 21/71* (2013.01)
(Continued)

(52) U.S. Cl.
CPC ............ *G06F 21/87* (2013.01); *G06F 21/552* (2013.01); *G06F 21/554* (2013.01);
(Continued)

(58) Field of Classification Search
CPC ...... G06F 21/87; G06F 21/552; G06F 21/554; G06F 21/602; G06F 21/71; G06F 21/86;
(Continued)

(56) References Cited

U.S. PATENT DOCUMENTS

| 7,039,815 B1 * | 5/2006 | Grassl | G06K 19/073 713/164 |
| 10,579,833 B1 * | 3/2020 | Cook | G06F 21/86 |

(Continued)

FOREIGN PATENT DOCUMENTS

EP 2031537 A1 3/2009

OTHER PUBLICATIONS

Anonymous: "Version 2.0 (for trial use) Joint Interpretation Library Application of Attack Potential to Hardware Devices with Security Boxes", XP055383899, Gefunden im Internet: URL:https://www.sogis.org/documents/cc/domains/hardware devices/JIL-%20Application-of-Attack-Potential-to-Hardware-Devices-with-Security-Boxes-v2-0-(for trial use).pdf; p. 6, line 1, p. 6, line 2, p. 22, line 64, p. 23, linev 70, p. 31, line 102, p. 31, line 105; 2015.

*Primary Examiner* — Shanto Abedin
(74) *Attorney, Agent, or Firm* — Schmeiser, Olsen & Watts LLP

(57) ABSTRACT

An apparatus for detecting a physical manipulation on a security module that stores security-relevant data includes a sensor device for generating sensor data that describe a physical influence on the security module, and a first and a second monitoring device, wherein the first monitoring device is set up to receive the sensor data from the sensor device and to take the sensor data as a basis for generating first monitoring data, and the second monitoring device is set up to receive the first monitoring data from the first monitoring device and to use the received first monitoring data to detect a manipulation of the security module. Two monitoring devices communicating with one another that in each case can discern a manipulation on the security module are used to ensure a high level of security for the security module.

13 Claims, 4 Drawing Sheets

(51) Int. Cl.
  *G06F 21/55* (2013.01)
  *G06F 21/86* (2013.01)
  *G06F 21/60* (2013.01)
(52) U.S. Cl.
  CPC ............ *G06F 21/602* (2013.01); *G06F 21/71* (2013.01); *G06F 21/86* (2013.01); *G06F 2221/2143* (2013.01)
(58) Field of Classification Search
  CPC .. G06F 21/50; G06F 21/60; G06F 2221/2143; G06F 12/1408
  See application file for complete search history.

(56) References Cited

U.S. PATENT DOCUMENTS

| | | | | |
|---|---|---|---|---|
| 2003/0009683 | A1* | 1/2003 | Schwenck | G06F 21/87 713/194 |
| 2005/0039040 | A1* | 2/2005 | Ransom | G01R 22/066 726/6 |
| 2006/0225142 | A1 | 10/2006 | Moon | |
| 2007/0204173 | A1* | 8/2007 | Kuhn | G07F 7/10 713/194 |
| 2008/0015814 | A1* | 1/2008 | Harvey, Jr. | G05B 23/024 702/179 |
| 2009/0060194 | A1* | 3/2009 | Mackey | G06F 21/86 380/277 |
| 2009/0300312 | A1* | 12/2009 | Handschuh | G06F 12/1408 711/166 |
| 2011/0055891 | A1* | 3/2011 | Rice | G06F 21/6218 726/2 |
| 2011/0307724 | A1* | 12/2011 | Shaw | G06F 21/78 713/323 |
| 2013/0298208 | A1* | 11/2013 | Ayed | H04L 27/00 726/6 |
| 2013/0305062 | A1* | 11/2013 | Falk | H04L 63/10 713/193 |
| 2014/0298492 | A1* | 10/2014 | Simpson | G06F 21/88 726/35 |
| 2014/0328483 | A1* | 11/2014 | Gessner | H04L 9/3234 380/29 |
| 2015/0340111 | A1* | 11/2015 | Halbig | G05B 19/058 700/9 |
| 2016/0283937 | A1* | 9/2016 | Reese | G06F 21/602 |
| 2017/0109953 | A1* | 4/2017 | Mullane | G07C 9/00309 |
| 2017/0116440 | A1* | 4/2017 | Huang | G06F 21/6218 |
| 2018/0114039 | A1* | 4/2018 | Sion | G06F 21/602 |
| 2018/0350170 | A1* | 12/2018 | Wang | G07C 9/215 |

* cited by examiner

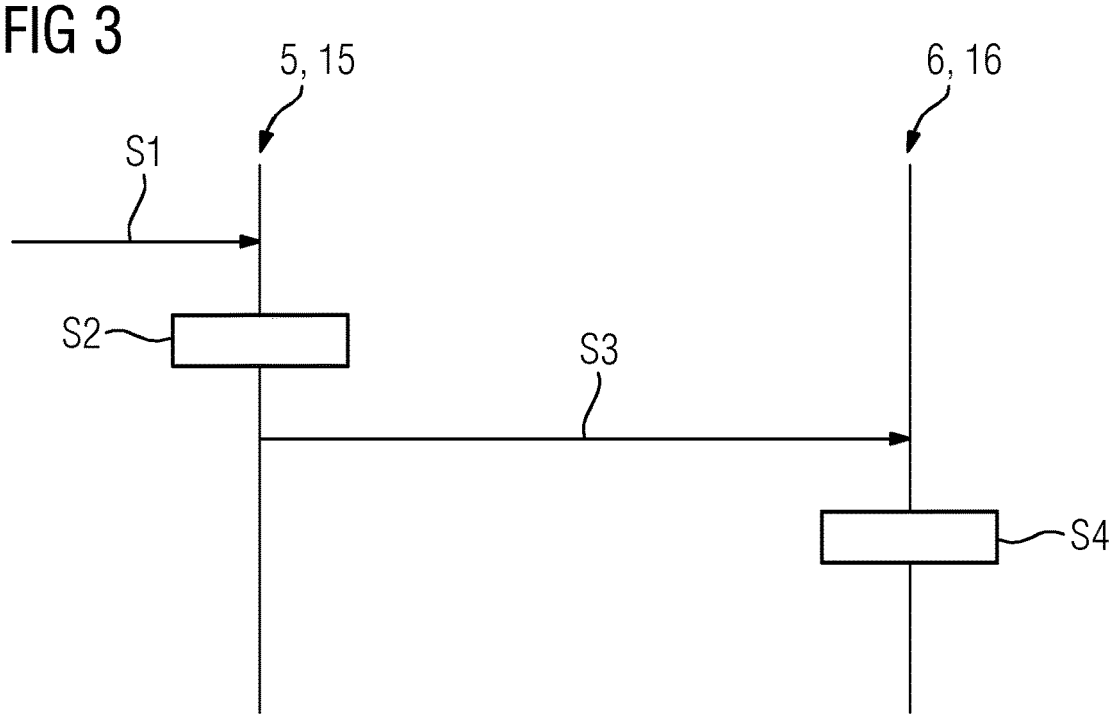
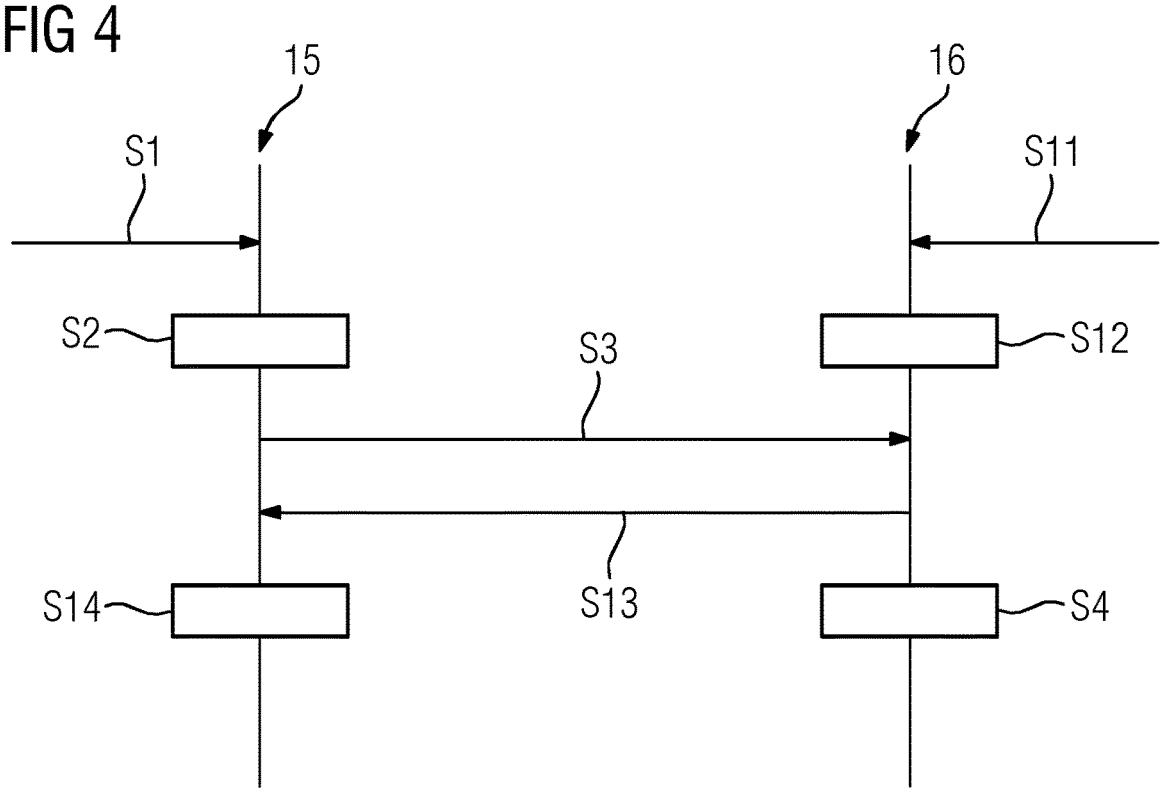

APPARATUS AND METHOD FOR DETECTING A PHYSICAL MANIPULATION ON AN ELECTRONIC SECURITY MODULE

CROSS-REFERENCE TO RELATED APPLICATIONS

This application claims priority to European application No. EP 17170625.2 having a filing date of May 11, 2017, the entire contents of which are hereby incorporated by reference.

FIELD OF TECHNOLOGY

The following invention relates to an apparatus and a method for detecting a physical manipulation on an electronic security module.

BACKGROUND

It is often necessary to protect security modules storing security-relevant data against physical manipulations, for example against opening or drilling-open of a housing of the security module. Such protection can be provided using tamper protection. This is usually accomplished by using different tamper sensors that sense physical properties of the security module. The sensor data are analyzed by evaluation algorithms in order to detect a manipulation. To ensure a high level of protection for the security module, particularly precise sensors and complex evaluation algorithms are frequently used.

An aspect relates to providing an improved apparatus for detecting a physical manipulation on an electronic security module.

SUMMARY

A further aspect provides an improved method for detecting a physical manipulation on an electronic security module.

Accordingly, an apparatus for detecting a physical manipulation on an electronic security module that stores security-relevant data is proposed. The apparatus comprises a sensor device for generating sensor data that describe a physical influence on the security module, and a first and a second monitoring device. The first monitoring device is set up to receive the generated sensor data from the sensor device and to take the received sensor data as a basis for generating first monitoring data, and the second monitoring device is set up to receive the first monitoring data from the first monitoring device and to use the received first monitoring data to detect a manipulation of the security module.

The electronic security module is in particular a hardware security module (HSM) in which security-relevant data can be stored and securely executed. The security module can comprise a housing that contains the electronic components of the security module. The security module may be a computer or a part of a computer, for example a Trusted Platform Module (TPM). It may also be a VPN (virtual private network) box, a public key infrastructure (PKI) for issuing certificates, a hardware trust anchor, a chip card controller or a hardware cryptocontroller.

The security-relevant data may be secret private data that are not supposed to be read or stored by unauthorized users. By way of example, these security-relevant data are keys, in particular cryptographic keys. They can be generated by the security module itself, or merely stored thereon.

The physical manipulation of the security module can be effected by an ill-intentioned person, for example, who wishes to access the security-relevant data. The physical manipulation is in particular a tamper attack. The manipulation may in particular be an attack on the security module, for example by opening, destroying or drilling through the housing or a protective casing provided inside the housing, such as e.g. a sealing compound or a protective cover for a circuit board arranged in the housing. The manipulation may also be undesirable movement of the security module, for example if the security module is stolen. Moreover, e.g. a light sensor or an infrared sensor for detecting thermal radiation may be provided.

The sensor data generated by the sensor device describe a physical influence on the security module, in particular an influence on the security module in the event of a manipulation. The influence can be expressed as a physical property of the security module or as a physical property in proximity to the security module, in particular in proximity to the housing, for example. Examples of the physical influence are described in more detail below. The sensor data can be generated, provided or requested and evaluated continuously or periodically.

The first monitoring device or first tamper monitoring device can in particular access the sensor device. The first monitoring device and the sensor device can accomplish this by interchanging data with one another wirelessly or via a wired connection. As a result, the first monitoring device can in particular receive sensor data. Moreover, it can generate first transmission data by means of evaluation algorithms, for example. The first transmission data may be identical to the sensor data. They may also be processed sensor data. The first monitoring device is realized as a cryptocontroller, for example.

The first transmission data generated by the first monitoring device are in particular transmitted to the second monitoring device. This transmission can be effected via an electrical connection, e.g. an SPI interface, an I2C interface, an RS232 interface, a USB interface, an optical interface, an optical fiber or a cable that connect the first monitoring device to the second. Moreover, in a variant, the transmission can be effected wirelessly, for example via WLAN or Bluetooth.

The second transmission device in particular evaluates the received monitoring data in order to determine whether or not there is a manipulation on the security module.

A manipulation on the security module can be detected by the second transmission device even if the first transmission device has not detected one. This increases the security of the security module. Moreover, the second transmission device may also be suitable for confirming a manipulation detected by the first transmission device. As a result, it is possible to prevent the first transmission device from erroneously detecting a manipulation. Therefore, the described apparatus affords increased manipulation protection or tamper protection.

According to one embodiment, the second monitoring device is set up to receive the captured sensor data from the sensor device and to take the received sensor data as a basis for generating second monitoring data. Further, the first monitoring device in this embodiment is set up to receive the second monitoring data from the second monitoring device and to use the received second monitoring data to detect a manipulation of the security module.

In particular, the second monitoring device may be set up identically to the first monitoring device. As a result, by way of example, it is also possible for the second monitoring device to take received sensor data as a basis for generating second monitoring data and to transmit said second monitoring data to the first monitoring device so that the first monitoring device detects a manipulation.

The first and second monitoring devices can process the received sensor data identically or differently, so that identical or different first and second monitoring data are generated. The two monitoring devices can interchange these monitoring data. In particular, both monitoring devices can use the respective received monitoring data to detect a manipulation. The two transmission devices can monitor one another. Each of the two transmission devices can detect a manipulation independently of the other and trigger an applicable treatment to protect the security module.

The security of the security module can be increased by virtue of a manipulation being able to be detected either by the first or by the second monitoring device. If the manipulation is missed by the first or the second monitoring device, it can still be detected by the other monitoring device. As a result, the security of the security module can be increased further.

According to a further embodiment, the first and/or the second monitoring device is further set up to at least partially erase the security-relevant data if the first and/or the second monitoring device detects a manipulation.

The security-relevant data may be associated with at least one of the two monitoring devices. By way of example, each monitoring device may have an associated portion of the security-relevant data. In particular, the security-relevant data are stored in a key memory. If a manipulation is detected, the monitoring device can provide an erase signal to erase or block the security-relevant data, or at least one portion thereof. As a result of the erasure of the security-relevant data in the event of a manipulation, it is possible to prevent the ill-intentioned person who is manipulating the security module from getting to the security relevant-data.

If a manipulation is detected, the security-relevant data can also be altered such that fake data instead of the original security-relevant data are stored in the security module. The ill-intentioned person would then obtain the fake data without noticing.

According to a further embodiment, the sensor device is set up to sense at least one movement or acceleration of the security module, or a noise level, a brightness, a movement, a gas composition, a vibration frequency or a vibration pattern, or a temperature inside or in proximity to the security module as the physical influence on the security module.

These physical influences are in particular caused by a manipulation on the security module.

In order to sense these physical influences, the sensor device in particular comprises sensors. By way of example, the movement of the security module can be sensed by a position sensor that senses a GPS position of the security module or a translation/rotation of the security module, for example. If the security module is stolen, tilted or generally moved, for example, during a manipulation, then this manipulation can be detected by the first and/or second monitoring device.

The noise level or a noise pattern inside or in proximity to the security module can be sensed by a sound sensor or an acceleration sensor, e.g. a MEMS sensor, that measures a volume at the security module, for example. If the security module is sawn open, drilled open or destroyed with a tool during a manipulation, the volume sensed by the sound sensor or the noise pattern changes and this manipulation can be detected by the first and/or second monitoring device.

The brightness inside or in proximity to the security module can be sensed by a light sensor. If the security module or the housing of the security module is opened during a manipulation, the brightness sensed by the light sensor increases and this manipulation can be detected by the first and/or second monitoring device.

The movement inside or in proximity to the security module can be sensed by a proximity sensor, for example an infrared sensor. If an ill-intentioned user approaches the security module, the proximity sensor spots him and a manipulation can be detected by the first and/or second monitoring device.

The gas composition inside or in proximity to the security module can be sensed by a chemical sensor. The latter can analyze the gas composition inside the security module, for example. In the event of a sudden change in the chemical composition of the gas, the manipulation is detected.

The vibration frequency or a vibration pattern of the security module can be changed by movement or drilling-open of the security module in the course of a manipulation, for example. In the event of such a change, a manipulation can be detected. Equally, a temperature change sensed by a temperature sensor can also indicate a manipulation.

Naturally, instead of the cited physical sensors, any sensors can be used for sensing any physical influences on the security module. For example, the sensor device can also comprise an anti-drilling protective film.

The monitoring device can also detect a manipulation for a combination of multiple events, for example if first a movement in proximity to the security module and then a movement of the security module is sensed.

When detecting the manipulation, it is in particular also possible to detect what kind of manipulation is performed, in particular what means the ill-intentioned person uses to perform the manipulation. This allows a category of manipulation to be detected, for example. In particular, the first and/or second monitoring device can distinguish between a normal failure of the other monitoring device and a manipulation, so that the first and/or second monitoring device is able, in the event of a normal failure of the other monitoring device, to store the security-relevant data from the latter.

According to a further embodiment, the sensor device comprises multiple sensors that in each case sense a physical influence on the security module.

Examples of the multiple sensors have already been cited above. It is possible that multiple sensors sense one and the same physical influence, for example a volume. This is useful because, even in the event of a malfunction in one of the sensors, it is still possible for at least one further sensor to sense the same physical influence, and for a manipulation not to be missed as a result.

Moreover, the sensors may be arranged at separate locations from one another in the security module such that it is also possible for a manipulation that is effected only on one side of the security module to be detected.

The sensors can also sense different influences. At least some of the sensors may be assigned to the first or second monitoring device, so that each of the monitoring devices has its own associated sensors.

According to a further embodiment, the first and/or the second monitoring device detects a manipulation of the security module if the respective other monitoring device detects a manipulation of the security module; and/or if the monitoring data transmitted by the respective other monitoring device are in a predetermined range that characterizes a physical manipulation; and/or if a comparison of the first and second monitoring data by the first and/or second monitoring device reveals that said data are not concordant with one another or are inconsistent; and/or if the monitoring data transmitted by the other monitoring device are erroneous.

If one monitoring device detects or reports a manipulation, it is also possible for the other monitoring device to detect it. In particular, the monitoring device that detects a manipulation can communicate this to the other monitoring device. As a result, each of the two monitoring devices can detect the manipulation and trigger an applicable treatment to protect the security module.

Further, a manipulation can be detected by one of the monitoring devices if the monitoring data transmitted by the other monitoring device are in a predetermined range that characterizes a physical manipulation. Limit values for this range may in particular be stored in advance in the first and/or second monitoring device. If the received monitoring data are outside the predetermined range, the first and/or second monitoring device determines that currently no manipulation is taking place. This can also be regarded as a threshold value comparison.

Further, a manipulation can be detected by one of the monitoring devices if a comparison of the first and second monitoring data by the first and/or second monitoring device reveals that said data are not concordant with one another or are inconsistent. In particular, the first and/or second monitoring device checks whether the discrepancy in its own monitoring data from the monitoring data of the other monitoring device is above an admissible discrepancy.

If the first and second monitoring data are generated based on the same sensor data or based on independently captured sensor data that are based on a joint physical effect, it can be expected that said monitoring data are identical or at least consistent. If this is not the case, for example if one monitoring device has been manipulated by the ill-intentioned person, then the manipulation can be detected by the other monitoring device.

Even if the first and second monitoring devices in each case are assigned sensors that detect the same physical influence, it is expected that the first and second monitoring data are identical or at least consistent. If this is not the case, for example if one sensor has been manipulated/destroyed by the ill-intentioned person, then the manipulation can be detected by the other monitoring device. As a result of the first and/or second monitoring device checking the first and second monitoring data for consistency, the ill-intentioned person needs to destroy/manipulate the two sensors in synchronized fashion in a complex manner so that no manipulation is detected. As a result, the security of the security module can be increased.

Further, a manipulation can be detected by one of the monitoring devices if the monitoring data transmitted by the other monitoring device are erroneous or plausible. Erroneous monitoring data are in particular monitoring data having an invalid format, or that appear implausible on the basis of their value. In the case of cryptographically protected monitoring data, it is also possible for an invalid cryptographic checksum to indicate erroneous monitoring data.

According to a further embodiment, the first and/or second monitoring device is further set up to receive monitoring data regularly sent by the other monitoring device and to detect a manipulation of the security module if the first and/or second monitoring device does not receive the monitoring data of the other monitoring device at a time or during a period at which or within which it should receive the monitoring data sent by the other monitoring device.

Regular sending of monitoring data in this case means in particular that the monitoring data are sent at regular intervals, for example every second. In particular, the sensor data are also generated regularly. It is possible in particular for reciprocal monitoring of whether the respective other monitoring device is still active to be effected. The manipulation can be detected if the expected monitoring data of the other monitoring device do not appear.

So that the manipulation is detected neither by the first nor by the second monitoring device, the ill-intentioned person needs to destroy/manipulate the first and/or second monitoring device in synchronized fashion, which is extremely complex. In particular, it is not possible to manipulate only one of the monitoring devices. As a result, the complexity of a successful manipulation for two monitoring devices is not only twice as great as for a single one, but even still higher, because the two independent monitoring devices need to be manipulated consistently and at the same time. Therefore, according to this embodiment, the security of the security module can be increased further.

According to a further embodiment, the security-relevant data at least consist of a first and a second key portion that form a key pair in a unique manner, wherein the first and/or the second monitoring device erases the first and/or second key portion if the first and/or the second monitoring device detects a manipulation of the security module.

The security-relevant data may be formed from multiple associated portions. By way of example, these portions are two key portions that form a key pair, in particular a cryptographic key pair. When a manipulation is detected, at least one key portion can be erased. It is in particular sufficient to erase only one key portion because the other key portion cannot be used without the associated key portion. Even if only one of the monitoring devices detects the manipulation, it is not possible for a usable or key to be obtained by the ill-intentioned person.

According to a further embodiment, the first and/or the second monitoring device is set up to transmit the first and/or second monitoring data in cryptographically encrypted fashion and/or to store said data. In particular, the monitoring data are protected by a cryptographic checksum, for example by a message authentication code or a digital signature. The two monitoring devices can use a shared key or they can each have one portion of a key pair, in particular a public or a private key portion.

According to a further embodiment, the first and/or the second monitoring device is set up to output a warning signal if it detects a manipulation of the security module. The warning signal can be transmitted to a trustworthy person, for example. It can also externally trigger an alarm. As a result, the security module can be additionally protected, and manipulations on other security modules can be prevented.

According to a further embodiment, the first and/or the second monitoring device evaluates the first and/or the second monitoring data by means of pattern recognition, threshold value comparison and/or using a neural network in order to detect a physical manipulation.

In particular, pattern recognition data and threshold value data may be stored in advance in a memory of the security module, for example in a RAM. Using the pattern recognition, the first and/or second monitoring device can in particular detect whether the first and/or second monitoring data have a similarity to data typical of manipulation or pattern recognition data.

The threshold value comparison involves the monitoring data being compared with prestored threshold value data that indicate a manipulation. Using the neural network, the monitoring device can continually learn more, in particular detect new monitoring data sequences that are typical of manipulation. By evaluating the monitoring data by means of pattern recognition, threshold value comparison and/or using a neural network, the monitoring devices can detect the manipulation in a reliable manner.

According to a further embodiment, the first and the second monitoring device are provided in the same physical area of the security module. In particular, the first and the second monitoring device are provided in the same housing or inside a shared casing of an electronic subassembly arranged in the housing.

According to a further embodiment, the first and the second monitoring device are provided in physically separate areas of the security module. In particular, the security module has at least two different areas. By way of example, the security module can have an inner and an outer area each having a security module. As a result, both areas can be protected. Each of the areas may store a portion of the security-relevant data, so that each area forms a security module part. If an attacker successfully attacks or manipulates one security module part, the other security module part can erase its portion of the security-relevant data, so that the attacker does not obtain the whole set of security-relevant data. Moreover, the security module arranged in the inner area can evaluate sensor data that are captured by sensors that are arranged in the inner area of the security module. Accordingly, the security module arranged in the outer area can evaluate sensor data that are captured by sensors that are arranged in the outer area of the security module.

According to a further embodiment, the first or the second monitoring device is permanently integrated with the security module, while the other monitoring device is removable out of or from the security module. The removable monitoring device can be plugged onto the security module internally or externally, for example.

According to a further embodiment, at least one third monitoring device is provided. The third monitoring device has in particular the same functions as the first and second monitoring devices. As a result, any number of monitoring devices can monitor one another. By way of example, each monitoring device can monitor each of the other monitoring devices, or the monitoring devices can monitor each other in pairs in each case.

According to a further embodiment, a method for detecting a physical manipulation on an electronic security module that stores security-relevant data is provided.

The method comprises:

generating sensor data that describe a physical influence on the security module;

in a first monitoring device, receiving the generated sensor data and generating first monitoring data based on the received sensor data; and in a second monitoring device, receiving the first monitoring data and detecting a manipulation of the security module using the received first monitoring data.

According to a further embodiment, the method is performed using the apparatus described above and below.

The embodiments and features described for the proposed apparatus apply to the proposed method accordingly.

Further possible implementations also comprise not explicitly cited combinations of features or embodiments described above or below for the exemplary embodiments. In this case, a person skilled in the art will also add individual aspects to the respective basic form of embodiments of the invention as improvements or additions.

BRIEF DESCRIPTION

Some of the embodiments will be described in detail, with reference to the following figures, wherein like designations denote like members, wherein:

FIG. 3 shows a method for detecting a physical manipulation on an electronic security module according to a first embodiment;

FIG. 4 shows a method for detecting a physical manipulation on an electronic security module according to a second embodiment;

In the figures, elements that are the same or have the same function have been provided with the same reference symbols, unless indicated otherwise.

DETAILED DESCRIPTION

Figure 1:
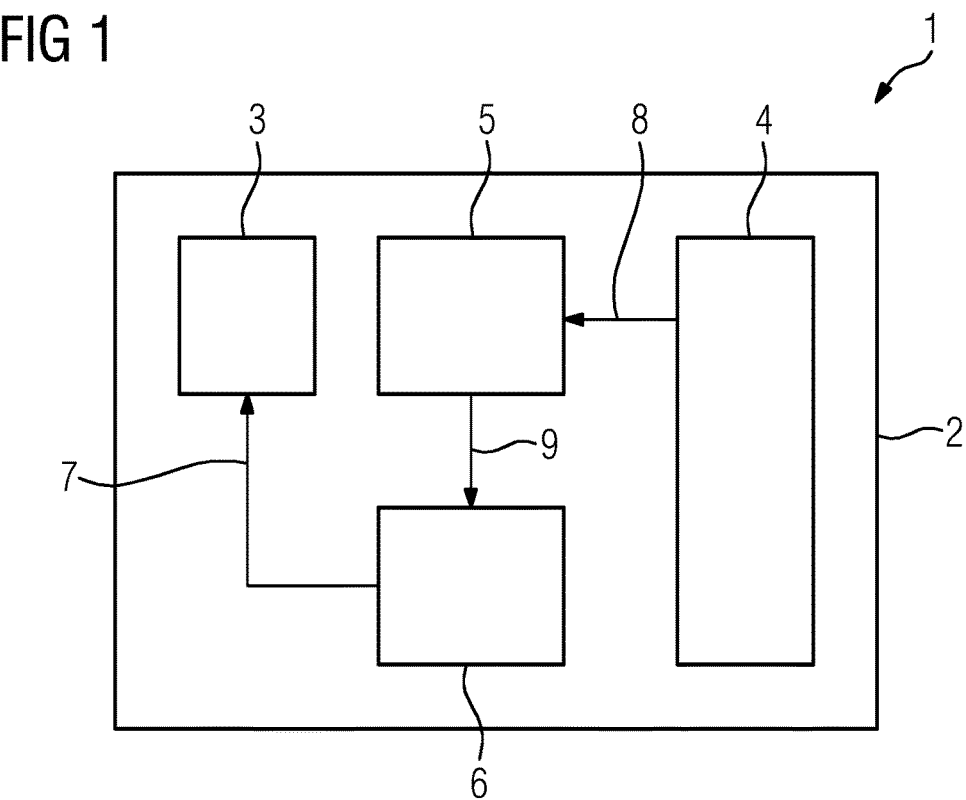
FIG. 1 shows an apparatus for detecting a physical manipulation on an electronic security module according to a first embodiment.

FIG. 1 shows an apparatus 1 for detecting a physical manipulation on an electronic security module 2 according to a first embodiment. The security module 2 is in this case a hardware security module (HSM) that has a memory 3, a sensor device 4 and also a first and a second monitoring device 5, 6. The individual electronic components of the HSM 2 are in this case stored in a housing, not depicted, of the HSM 2.

The memory 3, which in this case is a flash memory, stores security-relevant data to which an ill-intentioned person is not supposed to gain access. The security-relevant data in this case comprise in particular a cryptographic key. Security-relevant data may also be stored in a RAM-based memory chip, e.g. a battery-buffered SRAM memory, or in registers, however.

In the present embodiment, the sensor device 4 senses movements inside the HSM housing as a physical influence on the HSM 2. To this end, the sensor device 4 is configured as a motion sensor. Movements or vibrations or tremors inside the HSM housing are in particular sensed if an ill-intentioned person attempts to manipulate the HSM 2. The motion sensor 4 continuously captures sensor data that indicate whether or not there are movements inside the HSM housing, and what scale these movements have.

The two monitoring devices 5, 6 are in each case control units that are permanently installed in the HSM 2.

The apparatus 1 of FIG. 1 is set up to perform a method for detecting a manipulation on the HSM 2. Such a method is described with reference to FIG. 3.

In a step S1, the first monitoring device 5 receives sensor data from the sensor device or from the motion sensor 4. The transmission of the sensor data from the motion sensor 4 to the first monitoring device 5 is effected via a cable 8.

In a step S2, the first monitoring device 5 generates first monitoring data based on the received sensor data. To this end, the first monitoring device 5 processes the received sensor data by means of an evaluation algorithm and therefore generates first monitoring data. For example, the received motion sensor data are used to evaluate movement changes as first monitoring data.

Optionally, the first monitoring device 5 can moreover check whether the received sensor data or the generated first monitoring data have errors and/or are typical of manipulation, and if applicable can detect that there is a manipulation of the HSM 2.

In a step S3, the first monitoring device 5 sends the first monitoring data to the second monitoring device 6, which receives said data. The transmission of the first monitoring data is a wireless transmission that is depicted by an arrow 9 in FIG. 1.

In a step S4, the second monitoring device 6 uses the received first monitoring data to detect whether there is a manipulation of the HSM 2. To this end, the second monitoring device 6 compares the received first monitoring data with a prestored threshold value. If the received first monitoring data are above the prestored threshold value, it is determined that the movement sensed by the motion sensor 4 is there on account of a manipulation on the HSM 2.

If the second monitoring device 6 detects a manipulation or a tamper attack on the HSM 2, the second monitoring device 6 can erase the key stored in the memory 3 for the security of the HSM 2. To this end, the second monitoring device 6 uses an internal bus 7 to send an erase command to the memory 3, which performs the erasure of the key.

If no manipulation is detected by the second monitoring device 6, the described steps S1 to S4 are repeated.

Figure 2:
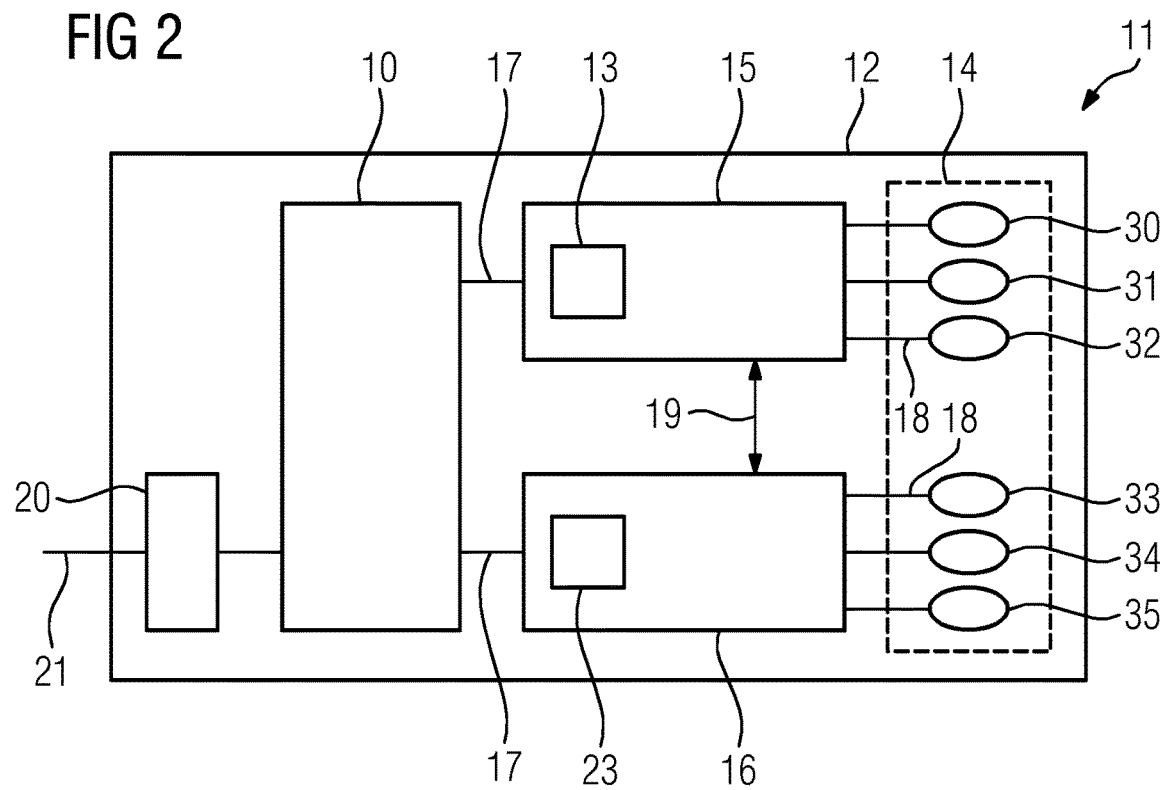
FIG. 2 shows an apparatus for detecting a physical manipulation on an electronic security module according to a second embodiment.

FIG. 2 shows an apparatus 11 for detecting a physical manipulation on an electronic security module 12 according to a second embodiment. The security module 12 is, in this case too, a hardware security module (HSM) that has a sensor device 14, a first monitoring device 15, a second monitoring device 16, a control unit 10 and an interface 20.

The apparatus 11 of the second embodiment differs primarily from the apparatus 1 of the first embodiment in that both monitoring devices 15, 16 can interchange and evaluate monitoring data. The reason is that the monitoring devices 15, 16 are equally suitable for receiving sensor data, processing said sensor data to generate monitoring data, receiving monitoring data from the other monitoring device and detecting a manipulation. Elements and properties that are identical to those of the first embodiment are not described again.

As shown in FIG. 2, the sensor device 14 depicted in dashes comprises a multiplicity of sensors 30-35. The sensors 30-32 are associated with the first monitoring device 15. A connection between the respective sensors 30-32 and the first monitoring device 15 is made via the cables 18, only a single cable being provided with the reference symbol in FIG. 2.

The sensors 33-35 are associated with the second monitoring device 16. A connection between the respective sensors 33-35 and the second monitoring device 16 is made via the cables 18, only a single cable being provided with the reference symbol in FIG. 2.

In the present embodiment, the first monitoring device 15 cannot access the sensors 33-35, and the second monitoring device 16 cannot access the sensors 30-32.

The sensors 30 and 33 are GPS sensors that sense an identical physical influence, namely a GPS position of the HSM 12. The sensors 31 and 34 are temperature sensors that sense a further identical physical influence, namely a temperature inside the HSM 12. The sensor 32 is a light sensor that senses a light brightness within the HSM 12 as a further physical influence. Finally, the sensor 35 is a motion sensor like the motion sensor 4 from the first embodiment.

The sensors 30-35 transmit the sensed physical influences to the monitoring devices 15, 16 as sensor data.

The first monitoring device 15 comprises a key memory 13 that stores a key portion, and the second monitoring device 16 comprises a further key memory 23 that stores a further key portion. The two key portions form a key pair as security-relevant data in a unique manner. The respective key portions need to be protected against an ill-intentioned person.

To this end, the apparatus 11 can perform the methods depicted in FIGS. 3 to 6. The method depicted in FIG. 4 is based on parallel performance of the method from FIG. 3 in the first and second monitoring devices 15, 16. Since steps S1 to S4 of the method from FIG. 3 are identical to steps S1 to S4 from FIG. 4, performance of the method from FIG. 3 using the apparatus 11 arises in an independent manner from the description below for the method of FIG. 4.

In step S1, the first monitoring device 15 receives sensor data from the sensors 30-32. In parallel therewith, the second monitoring device 16 receives sensor data from the sensors 33-35 in a step S11. The transmission of the sensor data is effected via the cables 18.

The monitoring devices 15, 16 generate, in steps S2 and S12, in each case first and second monitoring data. The steps S1 and S11 and also S2 and S12 can be performed at the same time or with staggered timing.

The first monitoring device 15, which receives sensor data from the sensors 30-32, generates firstly first monitoring data on the basis of the GPS position obtained from the sensor 30 and secondly first monitoring data combining the temperature and light data obtained from the sensors 31 and 32. The second monitoring device 16, which receives sensor data from the sensors 33-35, generates firstly first monitoring data on the basis of the GPS position obtained from the sensor 33 and secondly first monitoring data combining the temperature and movement data obtained from the sensors 34 and 35.

Optionally, the two monitoring devices 15, 16 already check whether the received sensor data or the generated monitoring data have errors and/or are typical of manipulation, and if need be output a warning or an erase signal. This is described below with reference to FIG. 6.

In step S3, the second monitoring device 16 receives the first monitoring data sent by the first monitoring device 15. At the same time, or with staggered timing, the first monitoring device 15 also receives the second monitoring data sent by the second monitoring device 16. The transmission is effected via a wireless connection 19. The transmitted monitoring data are interchanged in cryptographically encrypted fashion. To encrypt/decrypt the monitoring data, the respective monitoring devices store a cryptographic key.

In steps S4 and S14, the respective monitoring devices 15, 16 evaluate the received monitoring data and determine whether or not there is a manipulation. To determine whether a manipulation of the HSM 12 is taking place, it is in particular possible for the values of the first and second monitoring data to be compared in the respective monitoring devices. This is shown in particular in FIG. 5.

Figure 5:
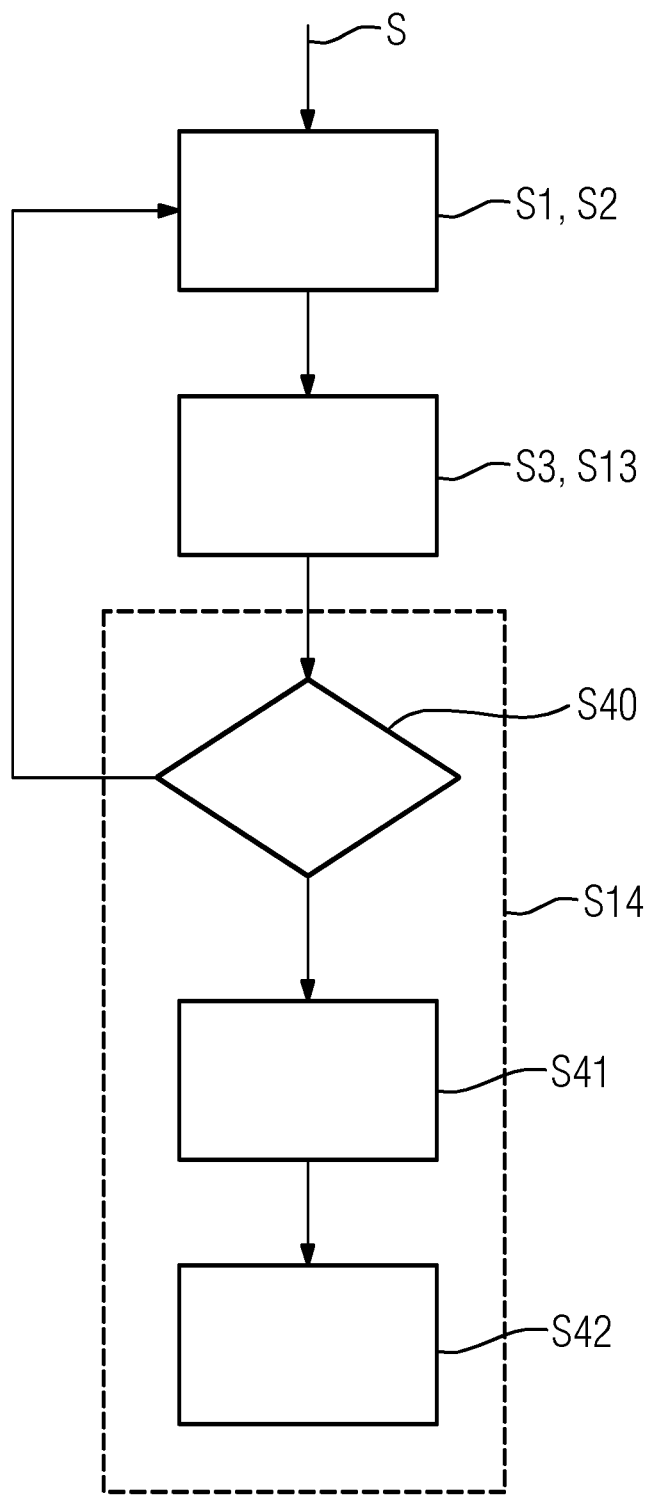
FIG. 5 shows a detailed method for detecting a physical manipulation on an electronic security module according to the second embodiment.

FIG. 5 depicts a sequence for a method for detecting a physical manipulation on the part of the second monitoring device 16. A method for detecting a physical manipulation on the part of the first monitoring device 15 would be identical.

The start of the method depicted in FIG. 5 is indicated by the arrow S. Steps S1-S3 and S13 are identical to steps S1-S3 and S13 from FIG. 4, and are not explained again. Step S14 is depicted in detailed fashion in FIG. 5. In a step S40, a check is performed to determine whether the first monitoring data received from the first monitoring device 15 are concordant with the second monitoring data. In the example above, it is possible, by way of example, for the first and second monitoring data that have been generated using the GPS position data of the sensors 30, 33 to be compared directly because it can be assumed that they are consistent.

In particular, a check is performed to determine whether a discrepancy between the first and second monitoring data is above an admissible discrepancy. If this is the case, then it is determined in step S40 that the monitoring data are consistent, and that there is no manipulation of the HSM 12. The method then continues with steps S1 and S2.

If it is detected in step S40 that the discrepancy is below the admissible discrepancy, however, then it is determined that the monitoring data are not consistent and that there is a manipulation of the HSM 12. The method then continues with step S41.

In step S41, a warning signal is output in order to externally trigger an alarm. The warning signal is generated in the second monitoring device 15 and transmitted to the control unit 10 via an internal bus 17. Said control unit, together with the interface 20, produces the connection to outside the HSM 12, for example via an Ethernet connection 21. If the warning signal is received externally, then steps can be taken against the manipulation. By way of example, security personnel can be sent to the site to check, or a service engineer can be instructed to inspect the security module. Moreover, a control function of a control system that use the security module can be deactivated or put into an inherently safe mode of operation (failsafe). As such, a controller can activate a specific mode of operation if a manipulation on a security module associated with the controller or with the control functionality is detected. An example of application is a robot that is actuated away from a control function that is realized on a remote computer system. By way of example, the control function may be realized as a service on a cloud-based infrastructure (cloud robotics). The communication for transmitting control data between robot and control function is cryptographically protected, e.g. by means of an IPsec or TLS protocol. The cryptographic keys used to set up the cryptographically protected communication link are stored on a security module associated with the robot. If this security module detects a manipulation, it can provide a warning signal to the robot that is evaluated e.g. by a drive control unit or power converter of the robot, so that the robot stops when a warning signal is provided (emergency stop).

In a step S42, an erase signal for erasing the key portion that is stored in the key memory 23 and associated with the second monitoring device 16 is generated. The key portion is then erased.

Steps S41 and S42 are optional and can also be performed in a different order. Further, the second monitoring device 16 is able, on detecting the manipulation, to send a signal to the first monitoring device 15 in order to inform it of the manipulation.

The second transmission device 16 can also detect a manipulation if the first transmission data expected in step S3 are not received. In this case too, steps S41 and S42 can subsequently be performed.

Figure 6:
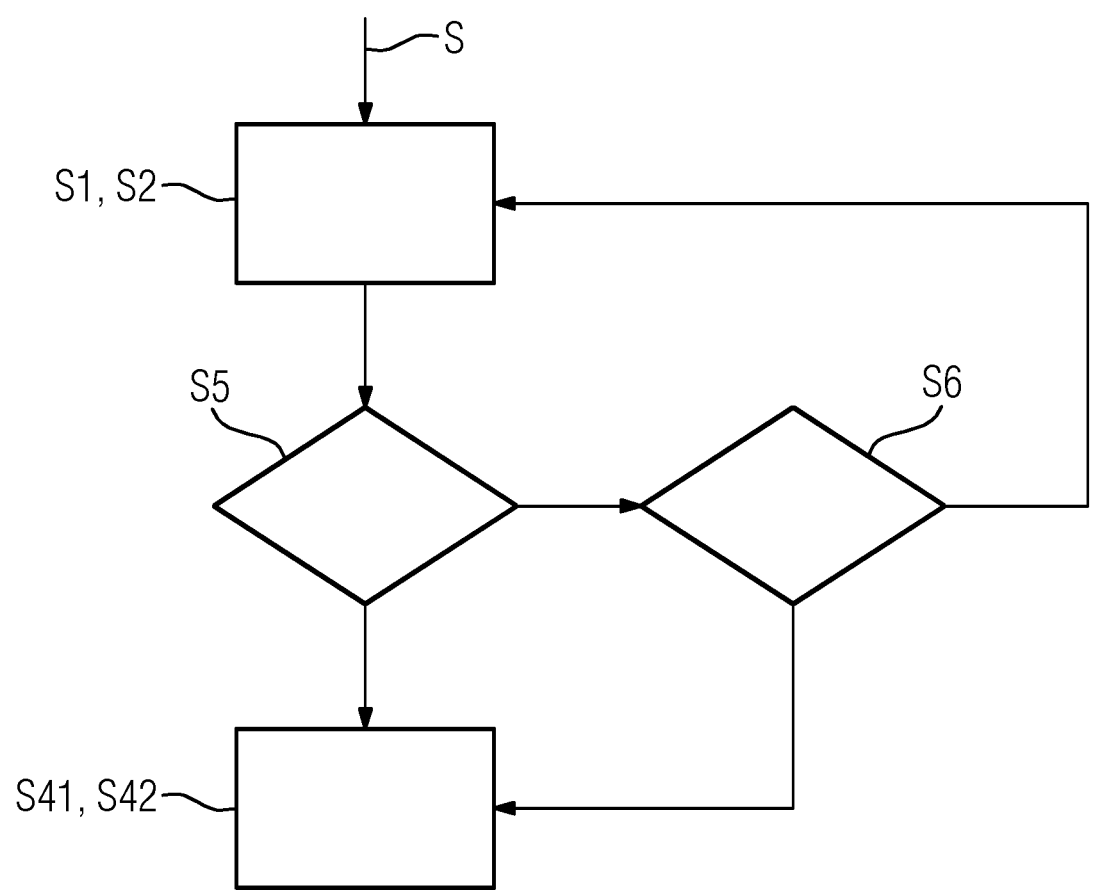
FIG. 6 shows a method for detecting a physical manipulation on an electronic security module according to a third embodiment.

FIG. 6 shows a method for detecting a physical manipulation on an electronic security module according to a third embodiment, which method can be performed using the apparatus 12 shown in FIG. 2, for example. The method from FIG. 6 may be part of the methods depicted in FIGS. 4 and 5, or can be performed independently thereof. FIG. 6 depicts a sequence for a method for detecting a physical manipulation on the part of the second monitoring device 16. A method for detecting a physical manipulation on the part of the first monitoring device 15 will be identical.

The start of the method depicted in FIG. 6 is indicated by the arrow S. Steps S1 and S2 are identical to steps S1 and S2 from FIGS. 3-5 and are not explained again.

In a subsequent step S5, the second monitoring device 16 determines whether the sensor data received from the sensors 33-35 or the generated second monitoring data are typical of a manipulation, that is to say indicate a manipulation. This can be effected using a trained neural network. Therefore, in step S5, it is determined whether there is a manipulation of the HSM 12. If so, the method is continued with steps S41, S42, which have already been described above.

If it is determined in step S5 that there is no manipulation, however, then the method is continued with a step S6, in which an inquiry is sent to the first monitoring device 15, for example via the wireless connection 19, to inquire whether the first monitoring device 15 has detected a manipulation. If so, steps S41 and/or S42 are performed. If no manipulation is detected by the first monitoring device 15 in step S6, the method is performed over from steps S1 and S2.

Although the present invention has been described using exemplary embodiments, it is modifiable in many diverse ways. In particular, any sensor devices or sensors can be used for sensing any physical influences. To generate the monitoring data, the sensor data can be processed by the monitoring devices in any way. The transmission of sensor data, monitoring data, warning signals etc. can be effected wirelessly or by wire. The evaluation algorithms that the monitoring devices use to evaluate the monitoring data to spot the manipulation can be modified in any way. More than two monitoring devices may be provided as part of the apparatus. The monitoring devices may also be provided in different, physically separate areas of the security module.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An apparatus for detecting a physical manipulation on an electronic security module that stores security-relevant data, the apparatus comprising:
   a sensor device for generating sensor data that describe a physical influence on the electronic security module; and
   a first monitoring device and a second monitoring device located inside the electronic security module, wherein the first monitoring device is set up to receive the generated sensor data from the sensor device and to take the received sensor data as a basis for generating first monitoring data;
   wherein the second monitoring device is set up to receive the first monitoring data from the first monitoring device and to use the received first monitoring data to detect a manipulation of the electronic security module;

wherein the first monitoring device and/or second monitoring device is further set up to receive monitoring data regularly sent by the other monitoring device and detects a manipulation of the electronic security module if the first monitoring device and/or second monitoring device does not receive the monitoring data of the other monitoring device at a time at which it should receive the monitoring data sent by the other monitoring device;

wherein the first monitoring device and/or the second monitoring device evaluates the first monitoring data and/or the second monitoring data by means of pattern recognition, threshold value comparison and/or using a neural network in order to detect a physical manipulation of the electronic security module.

2. The apparatus as claimed in claim 1, wherein the second monitoring device is further set up to receive the captured sensor data from the sensor device and to take the received sensor data as a basis for generating second monitoring data; and the first monitoring device is further set up to receive the second monitoring data from the second monitoring device and to use the received second monitoring data to detect a manipulation of the electronic security module.

3. The apparatus as claimed in claim 1, wherein the first monitoring device and/or the second monitoring device is further set up to at least partially erase the security-relevant data if the first monitoring device and/or the second monitoring device detects a manipulation.

4. The apparatus as claimed in claim 1, wherein the sensor device is set up to sense at least one movement or acceleration of the electronic security module, or a noise level, a brightness, a movement, a gas composition, a vibration frequency or a temperature inside or in proximity to the electronic security module as the physical influence on the electronic security module.

5. The apparatus as claimed in claim 1, wherein the sensor device comprises multiple sensors that in each case sense a physical influence on the electronic security module.

6. The apparatus as claimed in claim 1, wherein the first monitoring device and/or the second monitoring device detects a manipulation of the electronic security module if the respective other monitoring device detects a manipulation of the security module; the monitoring data transmitted by the respective other monitoring device are in a predetermined range that characterizes a physical manipulation; a comparison of the first monitoring data and the second monitoring data by the first monitoring device and/or second monitoring device reveals that said data are not concordant with one another or are inconsistent; or the monitoring data transmitted by the other monitoring device are erroneous.

7. The apparatus as claimed in claim 1, wherein the security-relevant data at least consist of a first key portion and a second key portion that form a key pair in a unique manner, wherein the first monitoring device and/or the second monitoring device erases the first key portion and/or second key portion if the first monitoring device and/or second monitoring device detects a manipulation of the electronic security module.

8. The apparatus as claimed in claim 1, wherein the first monitoring device and/or the second monitoring device is set up to transmit the first monitoring data and/or second monitoring data in cryptographically encrypted fashion and/or to store said data.

9. The apparatus as claimed in claim 1, wherein the first monitoring device and/or the second monitoring device is set up to output a warning signal if it detects a manipulation of the electronic security module.

10. The apparatus as claimed in claim 1, wherein the first monitoring device and the second monitoring device are provided in the same physical area of the electronic security module.

11. The apparatus as claimed in claim 1, wherein the first monitoring device and the second monitoring device are provided in physically separate areas of the electronic security module.

12. A method for detecting a physical manipulation on an electronic security module, the method comprising: utilizing the apparatus as claimed in claim 1.

13. A method for detecting a physical manipulation on an electronic security module that stores security-relevant data, the method comprising:

generating sensor data that describe a physical influence on the security module;

in a first monitoring device, receiving the generated sensor data and generating first monitoring data based on the received sensor data; and in a second monitoring device, receiving the first monitoring data and detecting a manipulation of the electronic security module using the received first monitoring data;

wherein the first monitoring device and/or second monitoring device is located inside the electronic security module and is further set up to receive monitoring data regularly sent by the other monitoring device and detects a manipulation of the electronic security module if the first monitoring device and/or second monitoring device does not receive the monitoring data of the other monitoring device at a time at which it should receive the monitoring data sent by the other monitoring device;

wherein the first monitoring device and/or the second monitoring device evaluates the first monitoring data and/or the second monitoring data by means of pattern recognition, threshold value comparison and/or using a neural network in order to detect a physical manipulation of the electronic security module.

* * * * *